United States Patent
McRoberts et al.

(10) Patent No.: US 7,883,770 B2
(45) Date of Patent: Feb. 8, 2011

(54) VEHICLE SEAT WITH IMPROVED CRAFTSMANSHIP

(75) Inventors: Terrence Marsh McRoberts, Holly, MI (US); James T. McEvoy, Howell, MI (US)

(73) Assignee: Johnson Controls Technology Company, Holland, MI (US)

( * ) Notice: Subject to any disclaimer, the term of this patent is extended or adjusted under 35 U.S.C. 154(b) by 453 days.

(21) Appl. No.: 11/730,346

(22) Filed: Mar. 30, 2007

(65) Prior Publication Data
US 2007/0269607 A1 Nov. 22, 2007

Related U.S. Application Data

(60) Provisional application No. 60/788,308, filed on Mar. 31, 2006.

(51) Int. Cl.
*B32B 3/26* (2006.01)
(52) U.S. Cl. .............. 428/319.1; 428/306.6; 428/308.4; 106/287.1
(58) Field of Classification Search .............. 428/319.3, 428/319.7, 212, 319.1, 306.6, 308.4; 106/287.1
See application file for complete search history.

(56) References Cited

U.S. PATENT DOCUMENTS

2006/0141228 A1* 6/2006 Rearick et al. .............. 428/212
2007/0134502 A1* 6/2007 Fonda ........................ 428/447

OTHER PUBLICATIONS

Presentation by The Woodbridge Group®, TrimVisible™, believed to be accessed at least by Mar. 27, 2007, 49 pages.

* cited by examiner

*Primary Examiner*—Hai Vo
(74) *Attorney, Agent, or Firm*—Foley & Lardner LLP

(57) ABSTRACT

A process for improving vehicle seat craftsmanship by camouflaging a receiving surface on a predetermined vehicle component (e.g., a foam seat cushion) is described. The camouflaging conceals the vehicle component from observation. One example of the process includes designating a receiving surface area on the vehicle component and providing a covering material having an opaque characteristic. The covering material includes an opaque dye that bonds with the polyurethane foam that is poured into a mold with deionized water for solidification. Another example of the process further includes spraying the covering material according to a surface of the mold cavity which corresponds to the designated receiving surface area on the vehicle component.

12 Claims, 11 Drawing Sheets

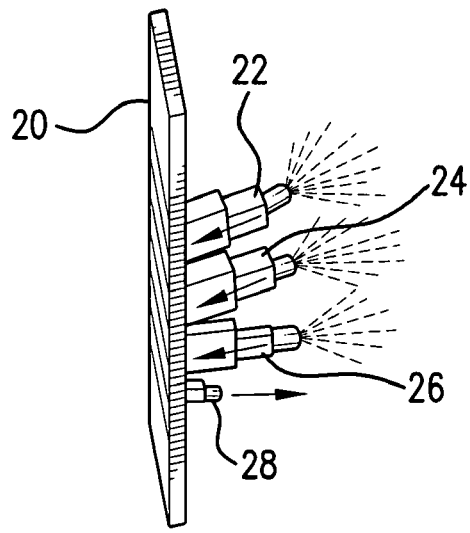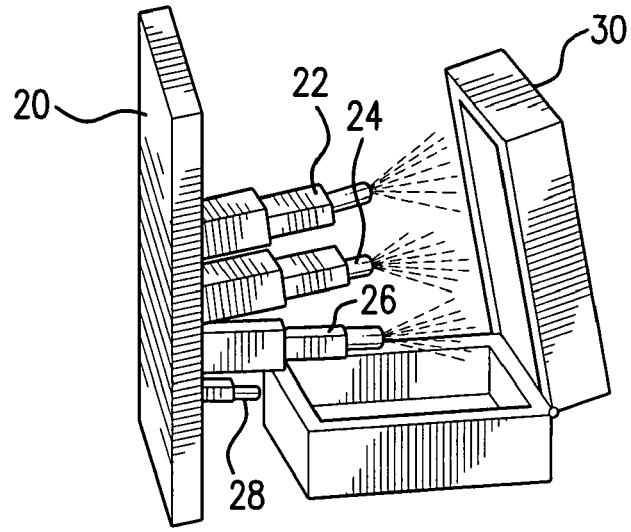
FIG.8a  FIG.8b
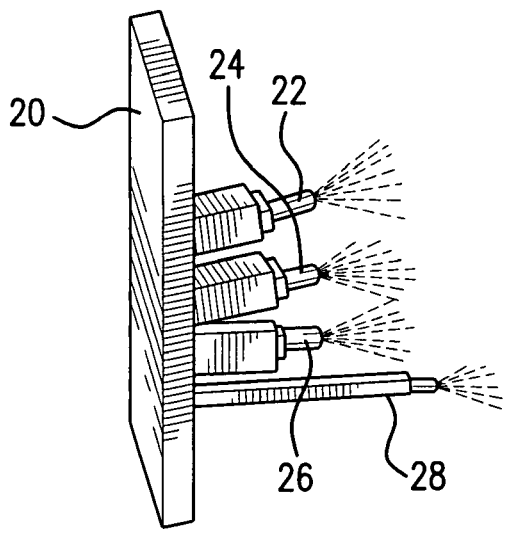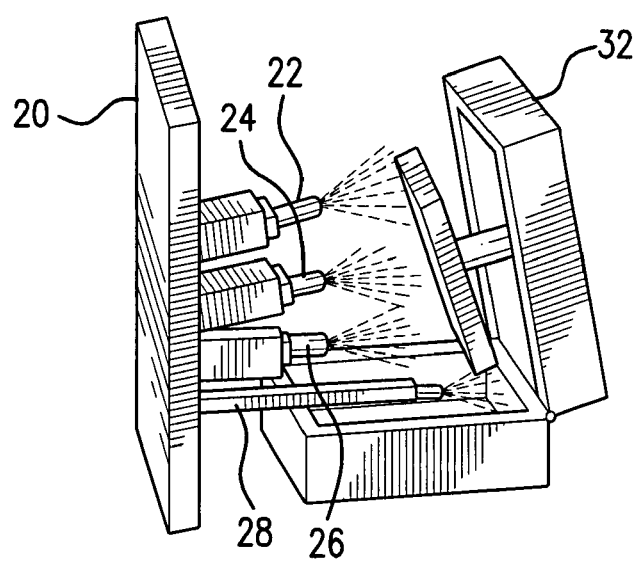
FIG.8c  FIG.8d

VEHICLE SEAT WITH IMPROVED CRAFTSMANSHIP

CROSS-REFERENCE TO RELATED PATENT APPLICATIONS

The present application claims the benefit of U.S. Provisional Patent Application No. 60/788,308 ("Vehicle Seat with Improved Craftsmanship") filed Mar. 31, 2006, which is hereby incorporated by reference it its entirety.

BACKGROUND

The application generally relates to a vehicle component assembly and to a process for improving vehicle craftsmanship. The application relates more specifically to nonionic polymeric colorant covering materials for spray application to vehicle components, including foam vehicle components, and an associated process for improving vehicle seat craftsmanship.

Vehicle craftsmanship directly influences consumer purchasing decisions. Motor vehicles include a substantial number of assembled components having multiple design considerations. The same holds true for a vehicle seat. In the vehicle seat, there are seat portions having foam such as the vehicle seat back and seat cushion. The foam typically has a white or substantially yellow colored tone; however, vehicle interiors are commonly gray, black or beige in color. When the light colored foam is visible, it contrasts with darker toned portions of the vehicle interior; the foam can easily be noticed and draw unwanted attention to that area of the vehicle interior.

One potential solution proposed by some foam manufacturers is to include a dye within the foam mixture. The appearance of the colored foam is less noticeable (or at least compliments the other components of the vehicle). While providing colored foam makes the foam less noticeable, it may be costly and potentially complicates the overall production process.

Marking of the foam has been utilized to color code areas of the foam so as to identify preferred assembly positions. However, the color-coding is typically applied to small areas and in a manner to be identified not concealed. For example, a green or red circle may be provided on the surface of the foam to indicate an upward position of mounting a foam seat cushion with respect to the seat frame. Likewise a red mark on the surface of a foam seat cushion may indicate the corresponding vehicle—in a multi-vehicle assembly line—for the seat cushion. Inapposite to camouflaging, flagging a surface of the foam serves to identify and bring attention to certain sections of the vehicle components.

Another method of covering foam pieces is to provide fabric that is applied to the molding cavity of the foam prior to molding the foam. The fabric is placed in the mold cavity and the polyurethane mixture is dispensed therein. Such additional parts can prove to be a costly addition to the price of the vehicle component.

Another method of concealing certain areas of vehicle components is to apply a plastic covering material or plastic insert covering the offending white area of the foam from vehicle occupants as a finishing step before shipment. Again, this may have significant cost implications on the vehicle component due to the need for additional parts.

Despite known methods for marking vehicle components to simplify the manufacturing process, craftsmanship issues persist regarding the visibility of off-colored vehicle components.

SUMMARY

One exemplary embodiment a process for improving vehicle seat craftsmanship by camouflaging a receiving surface on a vehicle component, the camouflaging thereby concealing the receiving surface of the vehicle component. The process includes designating a receiving surface area on the vehicle component, and providing a covering material having an opaque characteristic. The covering material includes deionized water, an opaque dye, and silicone material. The process also includes spraying the covering material in a mold cavity at a surface of the mold cavity corresponding to the designated receiving surface area on the vehicle component until the covering material completely covers the surface defined on the mold cavity.

Another exemplary embodiment relates to a process of making a covering material for camouflaging a vehicle component upon application, the camouflaging thereby concealing the vehicle component from observation and improving overall vehicle craftsmanship. The process includes providing a silicone material, adding a deionized water-based solution to the silicone material, adding an opaque dye to the deionized water-based solution and the silicone material, mixing the silicone material, water-based solution and opaque dye in a blend tank, and heating the covering material to a predetermined temperature.

Another exemplary embodiment relates to a covering material for camouflaging a vehicle component upon application, the camouflaging thereby giving the appearance of concealing the vehicle component from vehicle passengers. The covering material comprises a silicone material, a deionized water-based solution, and an opaque dye. The covering material is configured to be combined with a polyurethane solution forming a foam seat member upon emulsification.

Another exemplary embodiment relates to a process for improving vehicle seat craftsmanship by camouflaging a plurality of receiving surfaces on a vehicle component, the camouflaging thereby concealing the plurality of receiving surfaces on the vehicle component. The process includes designating the plurality of receiving surfaces on the vehicle component, providing a covering material having an opaque characteristic, and providing a mold cavity. The mold cavity defines a plurality of corresponding receiving surfaces, each corresponding receiving surface assigned to one of the plurality of receiving surfaces on the vehicle component. The process further includes providing a spray apparatus, applying the covering material to the corresponding receiving surfaces of the mold cavity, and pouring a polyurethane mixture into the mold cavity for solidification.

BRIEF DESCRIPTION OF THE DRAWINGS

FIGS. 8a-d are side and perspective views of a spray apparatus and a mold cavity according to one exemplary embodiment.

DETAILED DESCRIPTION

Figure 1:
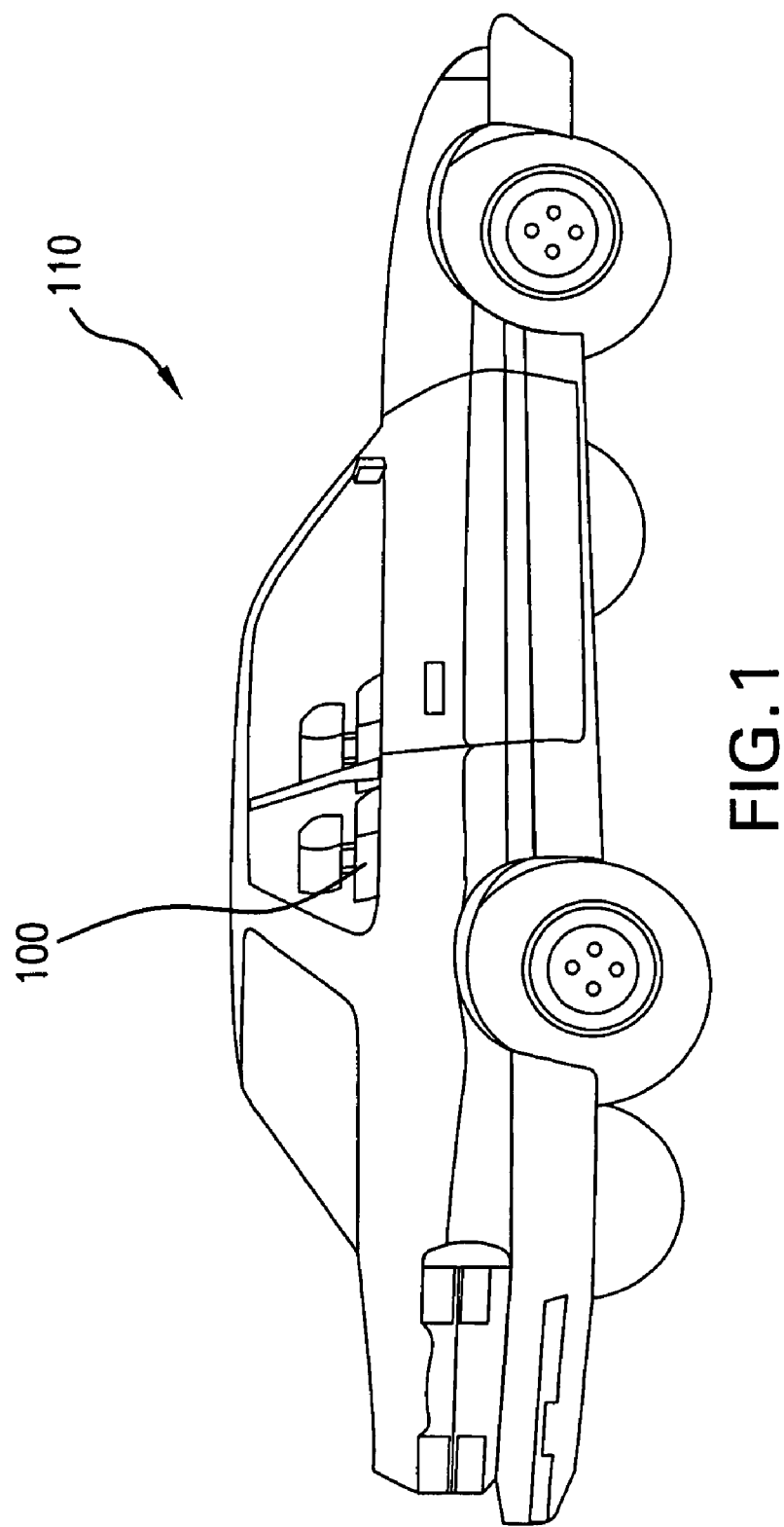
FIG. 1 is a perspective view of a vehicle having a vehicle seat therein according to an exemplary embodiment.

According to an exemplary embodiment, a vehicle component assembly (e.g., a vehicle seat assembly 100) is provided that is adapted for use in any variety of applications for a vehicle 110 (e.g., automobile, plane, train). The vehicle seat assembly 100 may be provided in locations throughout the vehicle other than the location shown in FIG. 1. The vehicle component assembly according to an exemplary embodiment can include a vehicle component of one color and a covering material of another color that is colored to more closely match the surrounding vehicle components. The covering material can be a nonionic polymeric colorant covering material for spray application to the vehicle component or to the cavity of a mold configured to form the vehicle component.

Figure 2:
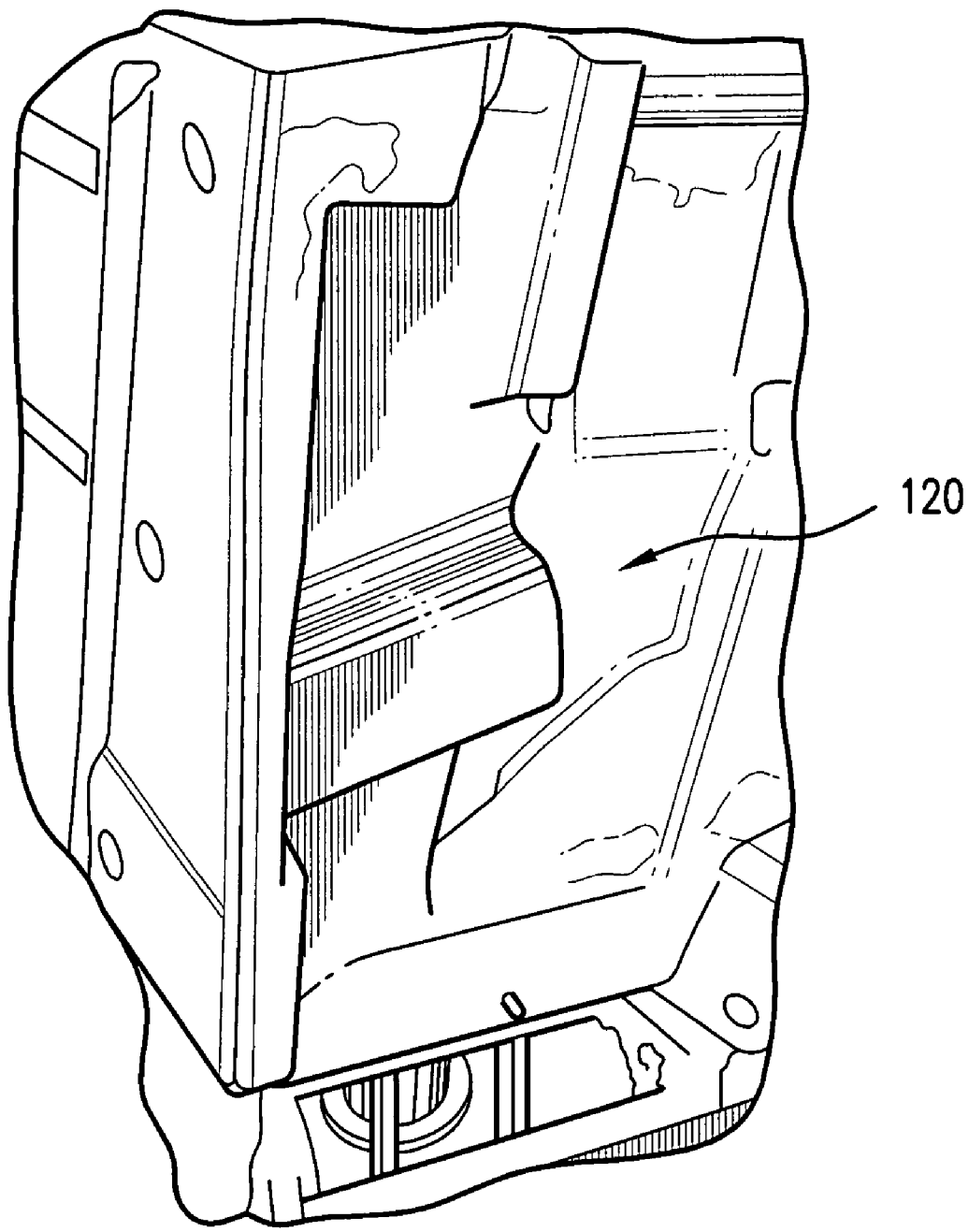
FIG. 2 is a perspective view of a mold cavity according to one exemplary embodiment.
Figure 3:
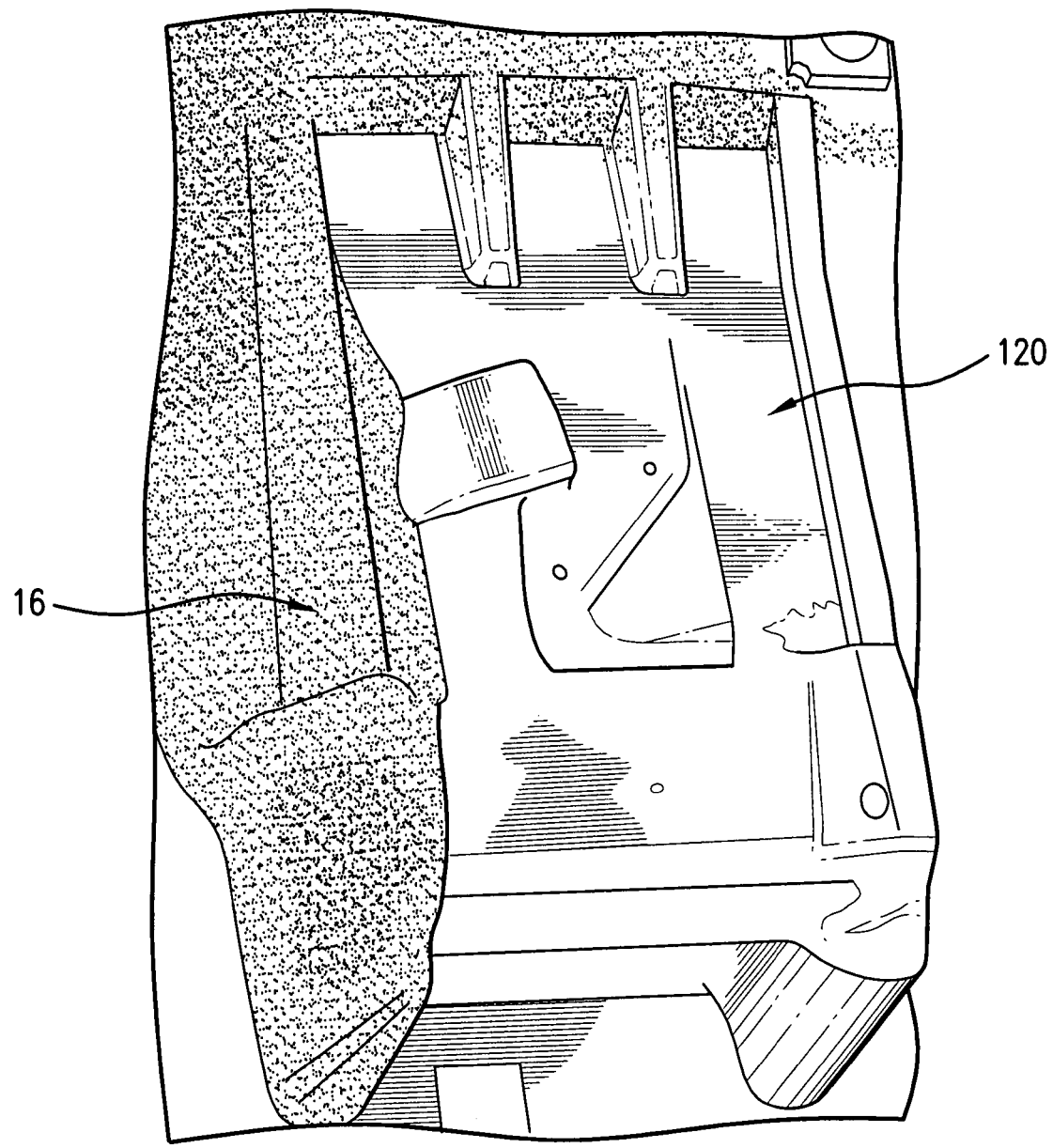
FIG. 3 is a perspective view of the mold cavity of FIG. 2 with covering material applied thereto according to one exemplary embodiment.

FIGS. 2 and 3 show a mold cavity 120 that can be used to mold a foam vehicle component for a vehicle according to one exemplary embodiment. It will be understood that the following description can apply to mold cavities to create vehicle components for the interior or exterior of a motor vehicle, A foam vehicle component can have a bright tone relative to the surroundings components of the vehicle and in certain areas be more noticeable than those surrounding components. To satisfy vehicle craftsmanship concerns, it is desirable to conceal or camouflage the bright tone of the vehicle component so that it is hidden from vehicle users or passengers. To do so, the covering material 16 can be selectively applied to the interior surface of the mold cavity 120. FIG. 2 shows the mold cavity 120 prior to application of the covering material 16, and FIG. 3 shows the mold cavity 120 after application of the covering material 16. After the curing of the foam vehicle component in the mold cavity 120, the covering material 16 can cover the otherwise bright exterior surface of the foam so that it more closely matches the tone of the surrounding components of the vehicle. Application of the covering material 16 to the mold cavity 120 will be explained in more detail in connection with FIGS. 8a-d, 9a-b, and 10a-c.

In the embodiment of FIGS. 2 and 3, the mold cavity 120 can be marked with instructional language such as "CLOTH" or "APPLY HERE." A cloth or upholstery material may be fastened to the interior surface of the mold cavity, and, following curing of the foam vehicle component in the mold, the cloth may adhere to the foam to provide improved foam durability. The cloth material might not, however, cover the entire exterior surface of the foam, and so covering material 16 may be applied to the mold cavity in those areas that the cloth does not reach. In this manner, after curing, cloth partially covers the foam vehicle component, and the covering material 16 may cover the remainder so that the otherwise bright tone of the foam is not visible. In an alternative embodiment, the cloth may be attached to the foam vehicle component after curing in the mold cavity 120.

Vehicle component 10 may be covered with a covering material 16 that camouflages the vehicle component as shown in FIGS. 4-7. The covering material 16 is an opaque material that at least partially covers the exterior of vehicle component 10. In one exemplary embodiment, the vehicle component 10 is composed of a foam member. Upon bonding or reacting with the foam vehicle component, the covering material 16 adheres to the foam vehicle component and gives the appearance of a tinted surface on the vehicle component.

The covering material 16 can include a black dye that bonds with the polyurethane foam that is poured into a mold (e.g., the mold cavity of FIG. 2-3). The polyurethane foam can fully react with dye in the covering material upon solidification such that the covering material does not disperse or rub off on other surfaces upon contact. Also included in the covering material mixture are deionized water and a silicone dispersing (or mixing) agent.

A process of making the covering material includes providing a black opaque dye material, adding a deionized water solution to a silicone material, mixing the silicone material, water-based solution and opaque dye in a blend tank, and heating the material to a predetermined temperature. The mixing may be performed in an industrial mixing tank configured to blend the water, dye and silicone together. The tank may also include a heating unit. In one exemplary embodiment, the material is heated to a temperature between 100 and 120 degrees Fahrenheit. In another exemplary embodiment, the covering material is heated between 80 and 180 degrees Fahrenheit. The length of time the mixture is heated is also variable. In one embodiment, the covering material is heated any where from 3 to 60 minutes.

Figure 7:
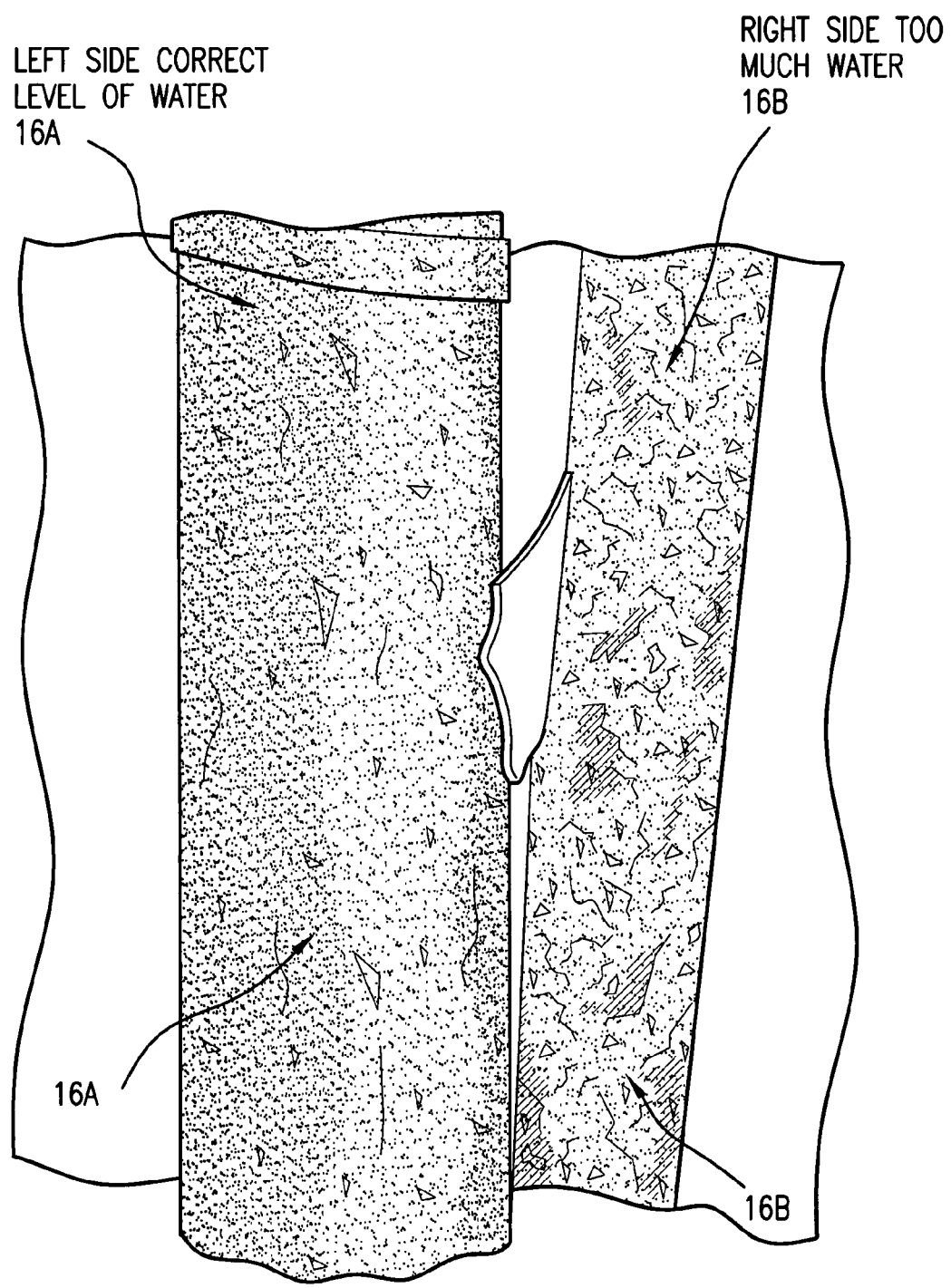
FIG. 7 is a perspective view of a vehicle component with covering materials having different water levels applied thereto according to one exemplary embodiment.

The ratio of silicone to water to dye may change according to the specified application. In one exemplary embodiment, the covering material consists of an at least 20% water-based solution. However, in another exemplary embodiment, the amount of water-based solution in the covering material may be altered to increase the viscosity of the covering material according to different vehicle components having different surface characteristics. For example, a vehicle component composed of a polymeric material requires a more viscous covering material than a vehicle component composed of a metallic material. Accordingly, the covering material can have different material characteristics to accommodate the surface texture of the receiving surface on the vehicle component. The embodiment of FIG. 7 shows covering material 16A and 16B of different levels of viscosity applied to a metallic receiving surface. The covering material 16A demonstrates an appropriate range of viscosity for application to a metallic receiving surface. The viscosity of the covering material 16B is outside of the appropriate range of viscosity for a metallic surface. The covering material 16B includes too much water. The variation in viscosity of the covering material is represented by different gradients or patterns as shown in FIG. 7.

The cover weight of the covering material may also change according to the specified application. The desirable cover weight is greater for some vehicle components than others. The cover weight for the covering material in one exemplary embodiment is between 5 and 15 grams for application to a foam seat member. In one exemplary embodiment, the mixture contains between 0.001 and 75% dye depending upon the overall coverage requirements.

In another exemplary embodiment, the covering material consists of at least 0.001% dye. The dye is opaque and in one exemplary embodiment configured to match a predetermined color scheme of the vehicle interior. For example, where adjacent components are of a darker hue, such as black or gray, the dye color may be black or charcoal so that the covered vehicle component compliments the color scheme of the vehicle interior. In the illustrated embodiments of FIGS. 4-6, the vehicle component 10 is a foam insert having a yellow tone. The vehicle component is covered with a covering material having a black tone on at least one surface after emulsifying in the mold cavity. Several shades of black may be utilized with the covering material such as REACTINT® products Black 1852, Black 2151, Black 2256, Black X95AB or Black X77.

Figure 4:
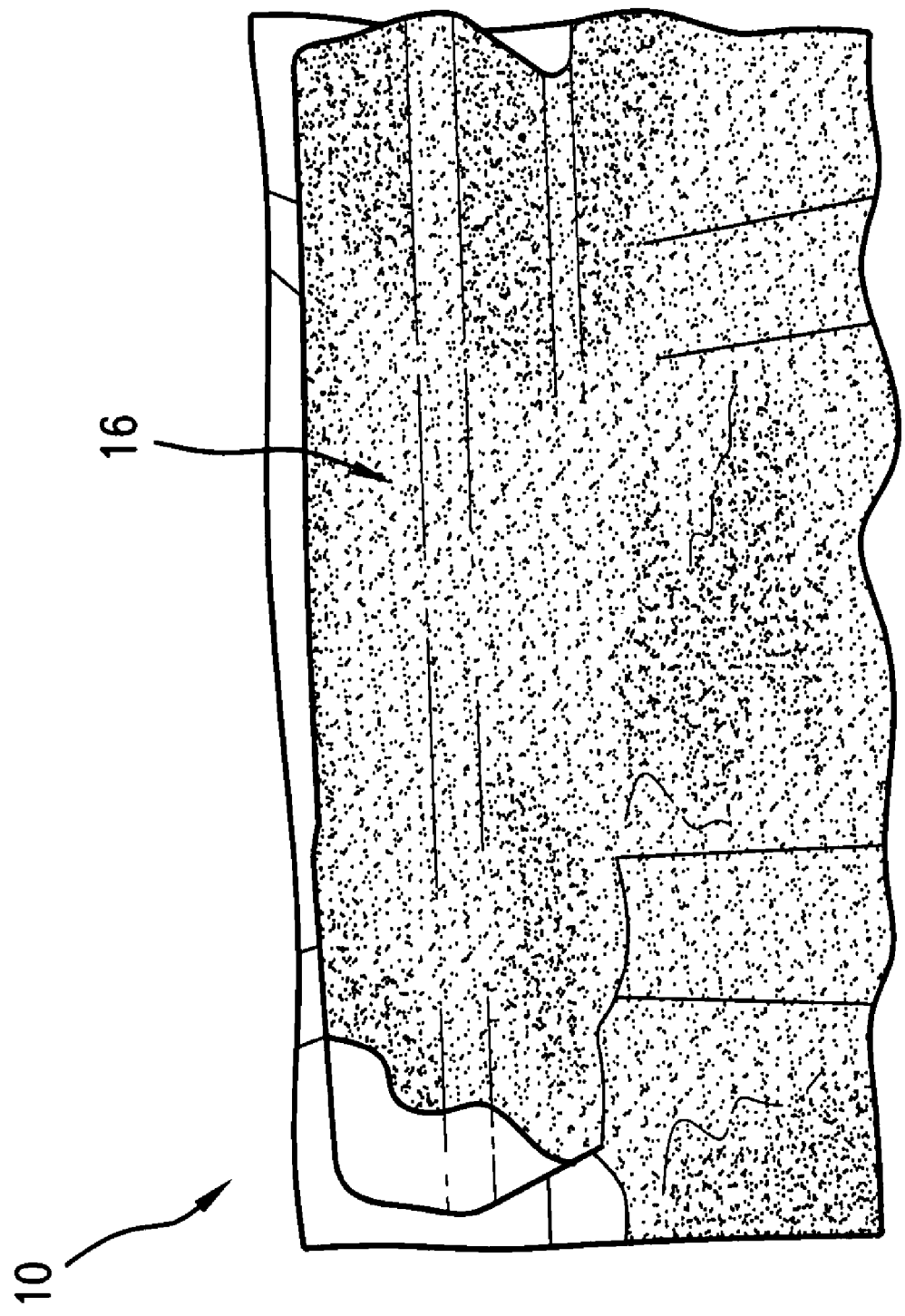
FIG. 4 is a perspective view of foam with covering material applied thereto according to one exemplary embodiment.
Figure 5:
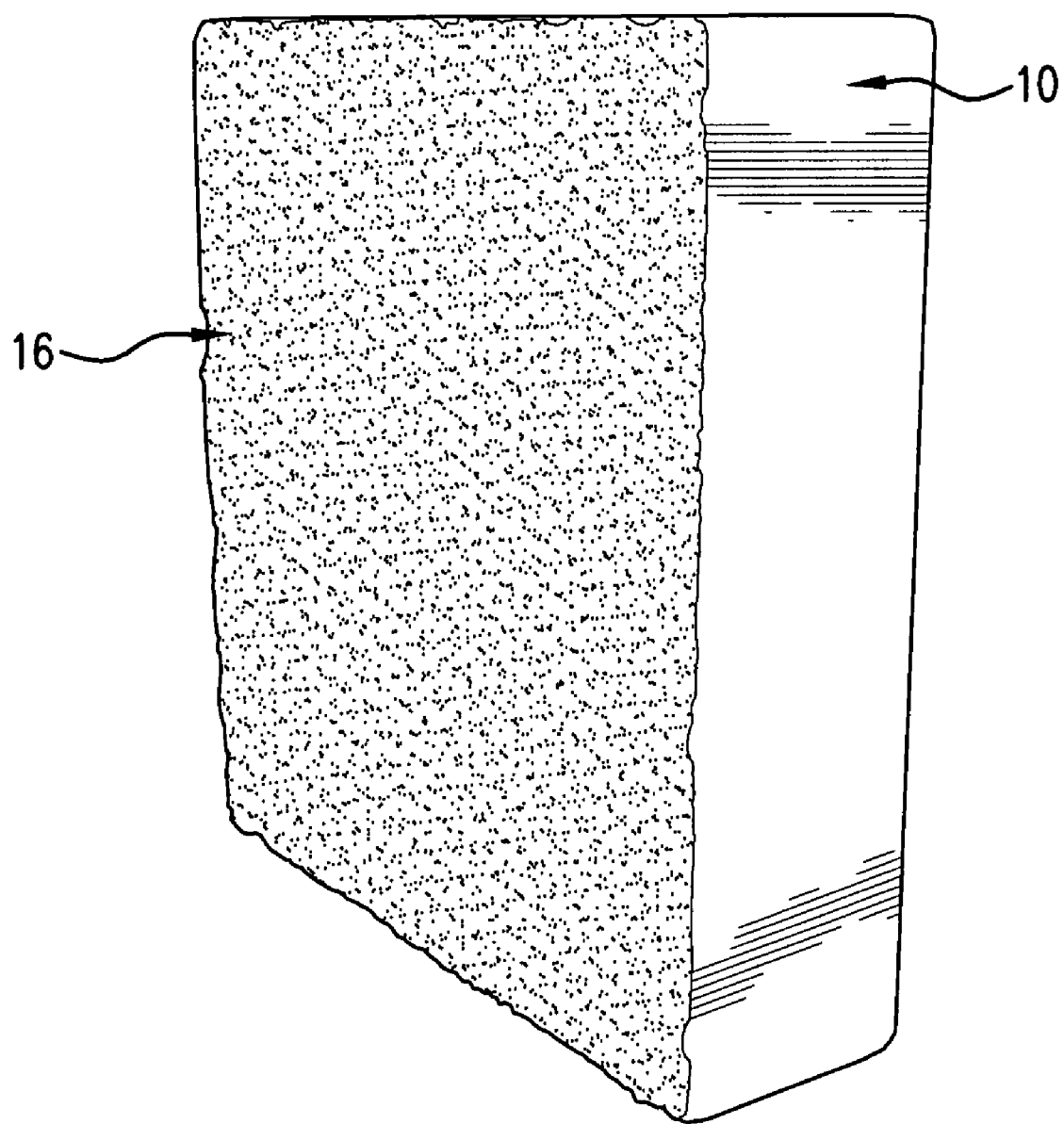
FIG. 5 is a perspective view of a vehicle component with covering material applied thereto according to one exemplary embodiment.
Figure 6:
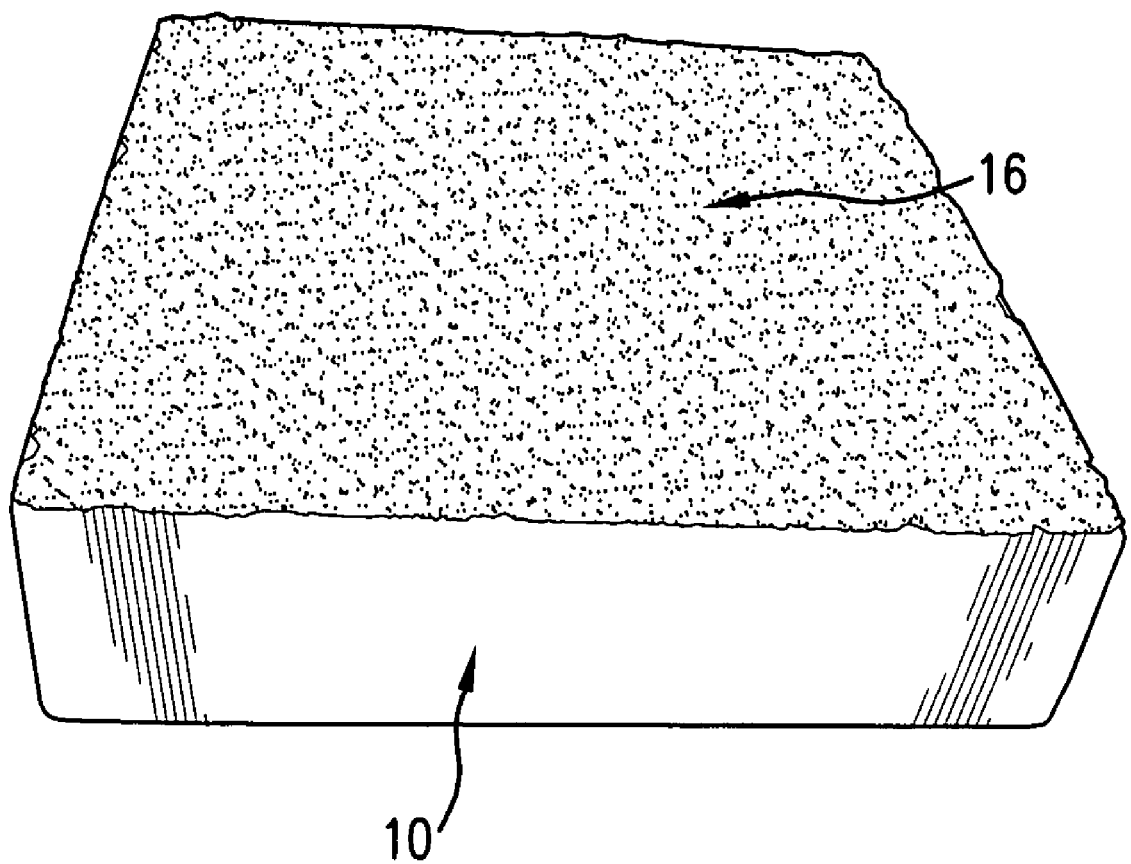
FIG. 6 is a perspective view of a vehicle component with covering material applied thereto according to one exemplary embodiment.

A process for improving vehicle seat craftsmanship by camouflaging a receiving surface on a vehicle component, the camouflaging thereby concealing the receiving surface of the vehicle component from observation, is also provided. The process includes designating a receiving surface area on the vehicle component and providing a covering material having an opaque characteristic. The covering material includes deionized water, an opaque dye, and silicone material. The process further includes spraying the covering material in a mold cavity according to a surface of the mold cavity which corresponds to the designated receiving surface area on the vehicle component until the covering material completely covers a designated receiving surface area defined on the mold cavity. The vehicle component is a foam member constructed from polyurethane poured into the mold cavity. By designating the receiving surface, the amount of covering material is conserved and is applied only to the needed areas. The designated area is not limited to forming and covering any one of six sides as shown in FIGS. 5-6. For example, the designated area may also form the top surface of a complex component as shown in FIG. 4 or a certain portion of a surface of the vehicle component as shown in FIG. 2.

The covering material 16 can be configured for spray application to the mold cavity of the vehicle component 10. The application of the covering material can be with a standard fixed adjustable spray apparatus with pneumatic controls. In one exemplary embodiment, a plurality of spray nozzles are incorporated on the assembly line to enable the water in the covering material to dry off faster so as to not create any surface damage. The spray nozzles may be coupled to a controller as a unit or independently. In one exemplary embodiment, the covering material is applied to the vehicle component at a pressure between 15 and 60 psi.

Figure 9B:
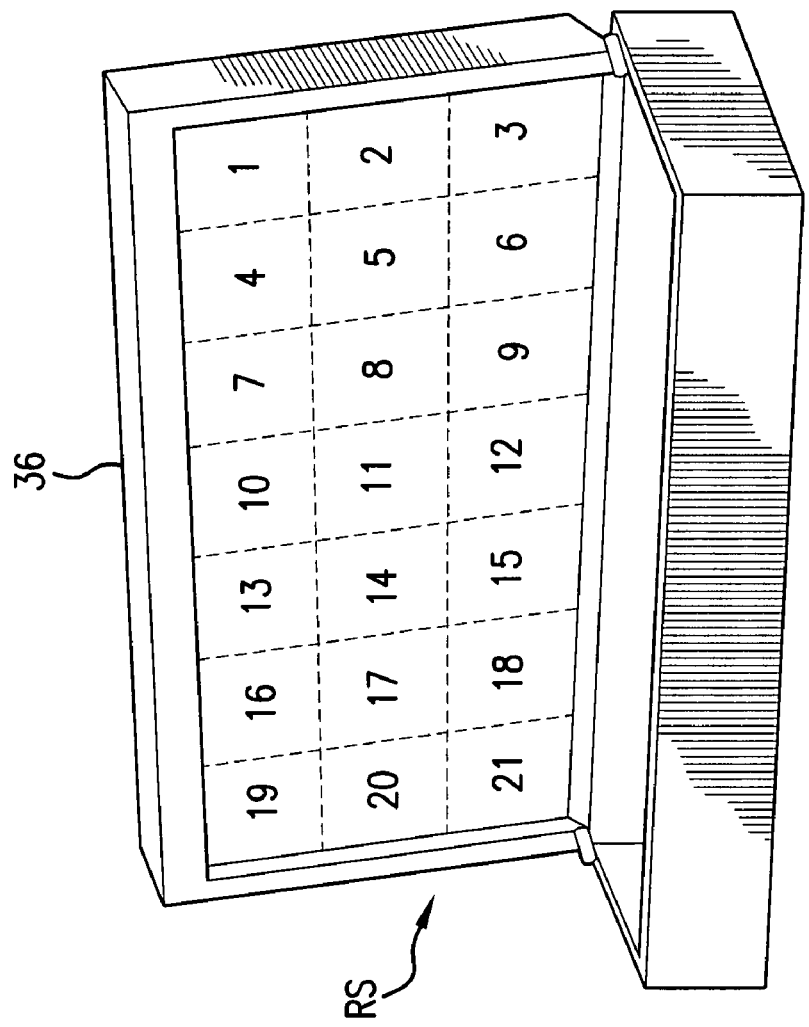
FIGS. 9a-b are perspective views of a mold cavity with corresponding receiving surfaces indicated according to one exemplary embodiment.
Figure 9A:
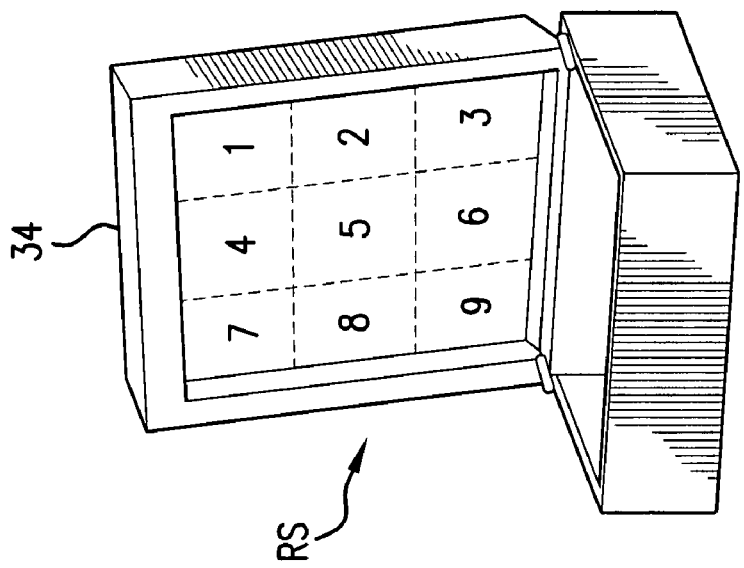

In exemplary embodiment, a process for improving vehicle seat craftsmanship by camouflaging a plurality of receiving surfaces on a vehicle component, the camouflaging thereby concealing the plurality of receiving surfaces on the vehicle component from observation, is provided. The process includes designating the plurality of receiving surfaces on the vehicle component and providing a covering material having an opaque characteristic. The covering material includes deionized water, an opaque dye, and silicone material. The process further includes providing a mold cavity, the mold cavity defining a plurality of corresponding receiving surfaces, each corresponding receiving surface assigned to one of the plurality of receiving surfaces on the vehicle component; providing a spray apparatus; applying the covering material to the corresponding receiving surfaces of the mold cavity; and pouring a polyurethane mixture into the mold cavity for solidification. In one embodiment, the covering material is applied via a spray apparatus 20 as shown in FIGS. 8a-d. The spray apparatus 20 includes a plurality of spray nozzles (or "guns")—22, 24, 26, and 28—configured to cover a corresponding receiving surface in the mold cavity (120, 30, 32, 34 and/or 36 as shown in FIGS. 2-3, 8b, 8d and 9a-b, respectively). The corresponding receiving surfaces are assigned to one of the plurality of receiving surfaces on the vehicle component. The corresponding receiving surfaces ("RS") may be assigned indicators. For example, the corresponding receiving surface labeled "7" in FIG. 9a is assigned to a receiving surface on the bottom perimeter of the vehicle component.

Where the mold cavity includes a complex surface—e.g., 32 as shown in FIG. 8d—the spray apparatus 20 is configured to include at least one additional nozzle 28 extendable to a position farther outward from the remaining spray nozzles 22, 24 and 26, thus enabling the extendable nozzle 28 to reach the intricate position of the mold cavities (e.g., 32). The mold cavities 34 and 36 can define a plurality of receiving areas as shown in FIGS. 9a-9b which correspond to the shape of the vehicle component 10. The mold cavity 34, as shown in FIG. 9a, is a schematic representation of a mold cavity for an individual passenger seat. The mold cavity 36, as shown in FIG. 9b, is a schematic representation of a mold cavity for a multiple passenger seat such as a seat bench or row. The spray apparatus 20 is configured to spray any number of the indicated receiving surfaces for coverage.

Figure 10C:
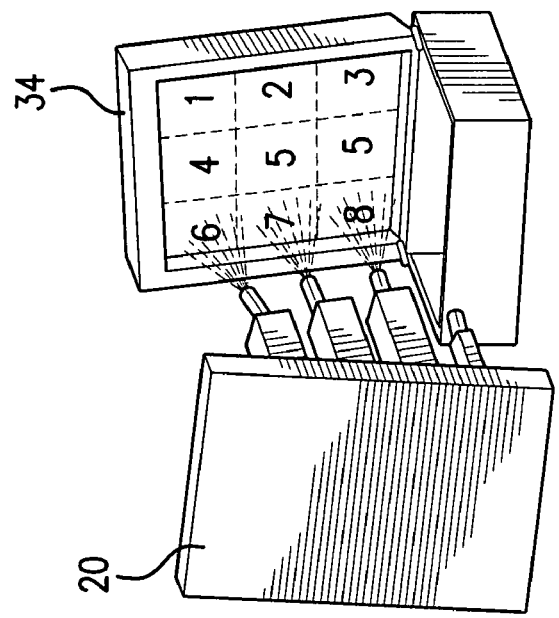
FIGS. 10a-c are perspective views of the application of covering material to a mold cavity according to one exemplary embodiment.
Figure 10B:
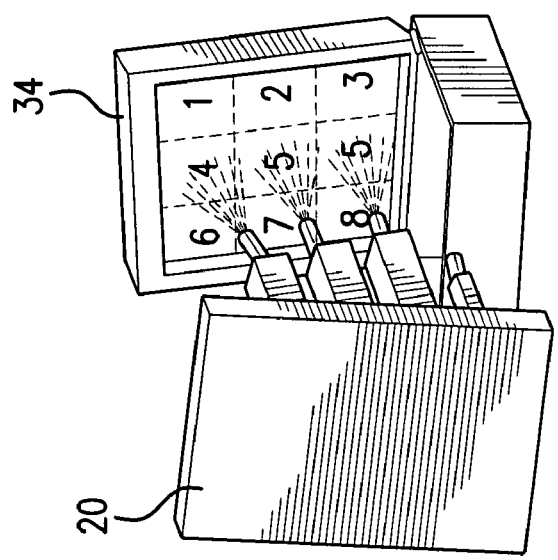
Figure 10A:
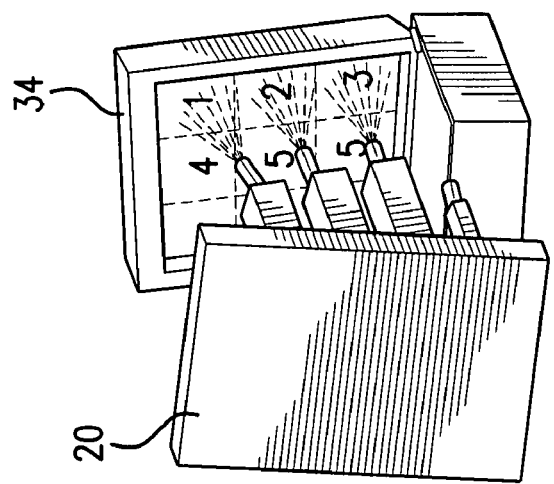
Figure 11:
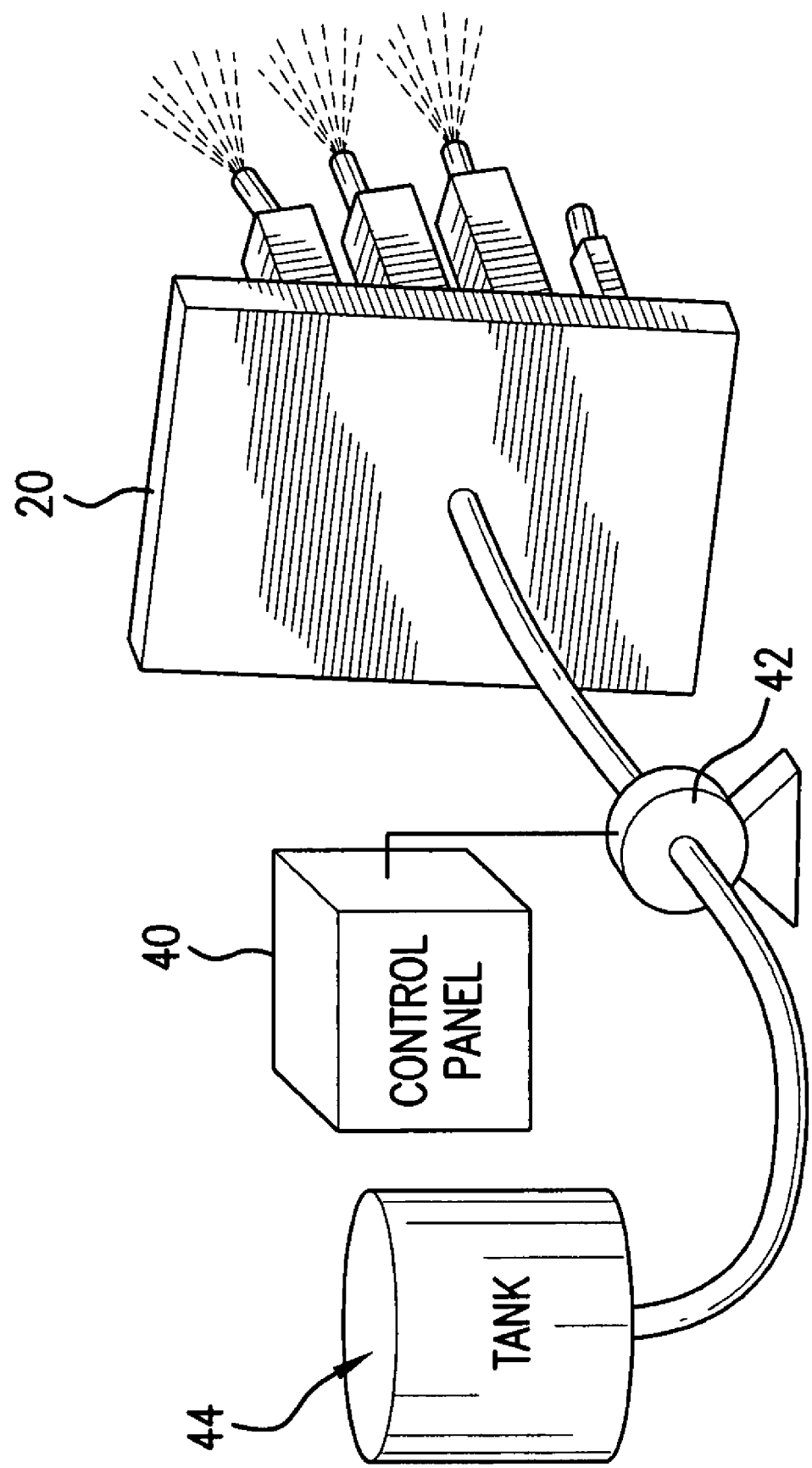
FIG. 11 is a perspective view of a spray apparatus according to one exemplary embodiment.

In one exemplary embodiment, a control module 40 (or panel), such as shown in FIG. 11, is coupled to the spray apparatus 20 to govern the application of the covering material to the corresponding areas on the mold cavity. The spray apparatus 20 and/or mold cavity 34 are configured to move with respect to each other as shown in FIGS. 10a-c. The direction of movement "X" of the mold cavity 34 with respect to the spray apparatus 20 is shown in the exemplary illustrated embodiment. The control panel 40 also governs the pressure at which the covering material is applied to the mold cavity as provided by a pump 42 (or pneumatic control) as shown in FIG. 11. The covering material is fed from a tank 44 and into the spray apparatus 20 via the pump 42. The pump 42 may be a high pressure low volume (HVLP) pump or other comparable pneumatic device known to persons of ordinary skill in the art. In one exemplary embodiment, the control panel 40 and covering material are configured to apply the covering material at a rate of 0.8 seconds per vehicle component. In another embodiment, the control panel 40 is configured to apply the covering material from 0.1 to 1.5 seconds per vehicle component.

It will be understood that the vehicle component may be any number of different components such as foam cushion (or insulation) pieces, cavities defined by a plurality of other vehicle components, metallic or polymeric surfaces, internal shafts, bonding materials, electronic wiring, fasters, and the like.

It should be understood that the construction and arrangement of the elements of the covering material and vehicle component in the exemplary embodiments are illustrative only. Although several embodiments of the covering material and vehicle component have been described in detail in this disclosure, many modifications are possible (e.g., variations in size, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of the elements may be reversed or otherwise varied, and the nature or number of discrete elements or positions may be altered or varied. Accordingly, all such modifications are intended to be included within the scope of the present invention as defined in the appended claims. Unless specifically otherwise noted, the claims reciting a single particular element also encompass a plurality of such particular elements. The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the spirit of the present invention as expressed in the appended claims.

What is claimed is:

1. A vehicle component assembly, comprising:
    a vehicle component including a receiving surface and comprising a foam structure; and
    a covering material at least partially covering the receiving surface, the covering material having an opaque characteristic,
    wherein the covering material includes deionized water, an opaque dye, and silicone material,
    wherein, during formation of the foam structure, the covering material combines with a solution forming the foam structure by emulsification such that, upon solidification of the foam structure, the covering material is dispersed in and bonded to the foam structure.

2. The vehicle component assembly of claim wherein the vehicle component is configured to fit in a vehicle interior.

3. The vehicle component assembly of claim 2 wherein the vehicle interior has a predetermined color scheme, and wherein the opaque dye is configured to complement the predetermined color scheme of the vehicle interior.

4. The vehicle component assembly of claim 1 wherein the covering material consists of the deionized water, the opaque dye, and the silicone material.

5. The vehicle component assembly of claim 1 wherein the foam structure is constructed from a polyurethane mixture.

6. The vehicle component assembly of claim 5 wherein the polyurethane mixture fully reacts with the covering material during the solidification of the foam structure such that the covering material is prevented from moving upon contact.

7. The vehicle component assembly of claim 1 wherein the deionized water is a component of a deionized water-based solution, and wherein the water-based solution comprises at least 20% of a material weight composition of the covering material.

8. The vehicle component assembly of claim 1 wherein the opaque dye comprises at least 0.001% of a material weight composition of the covering material.

9. The vehicle component assembly of claim 1 wherein the covering material comprises a cover weight between 1 and 30 grams per receiving area.

10. The vehicle component assembly of claim 1 wherein the silicone material is a silicone dispersing agent.

11. The vehicle component assembly of claim 1 wherein the vehicle component is an automotive interior polyurethane product.

12. The vehicle component assembly of claim 1 wherein, during formation of the foam structure, the covering material reacts with the foam structure.

\* \* \* \* \*